Sept. 22, 1942.  H. F. SCHNEIDER  2,296,311
PARKING SIGNAL
Filed Aug. 14, 1939
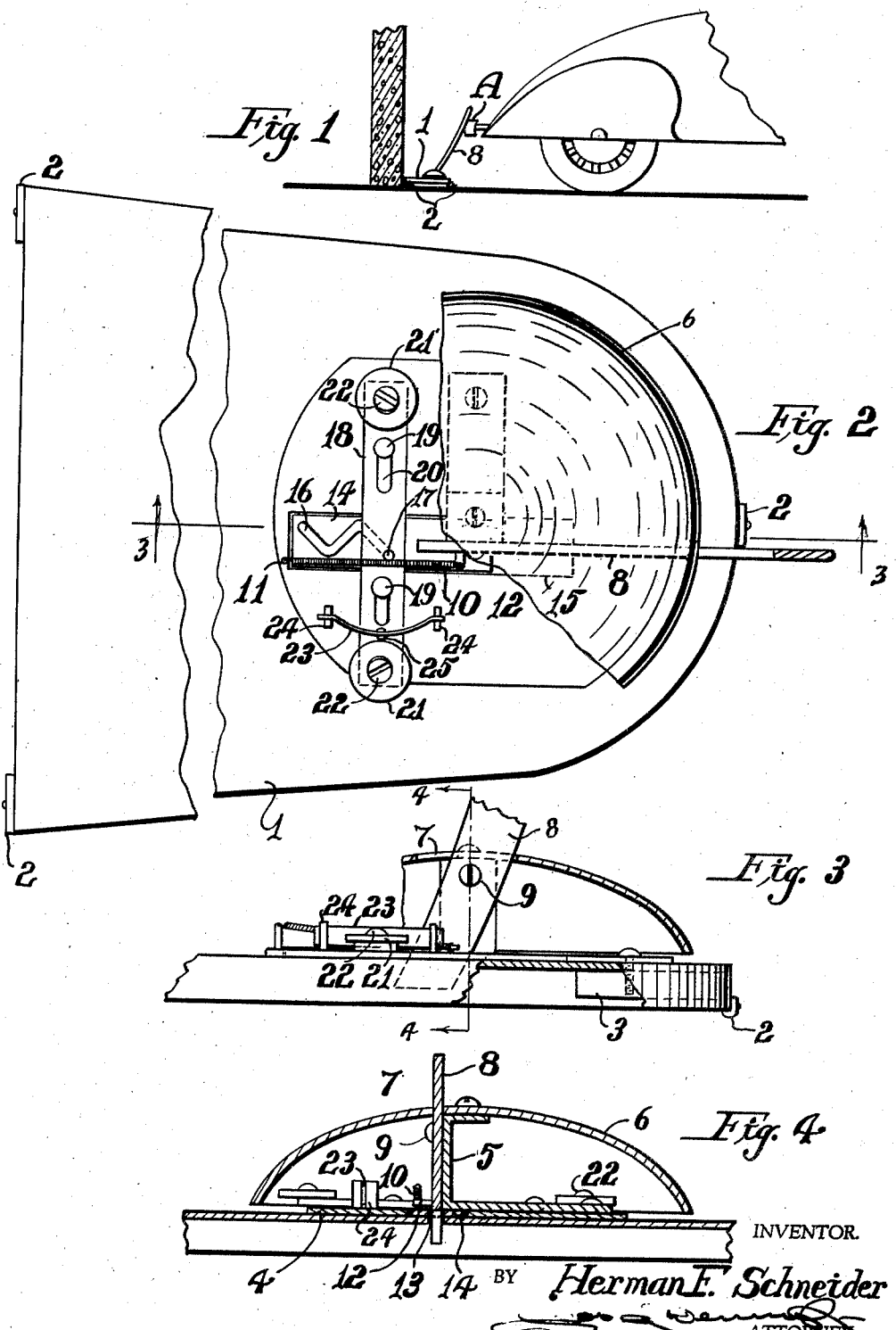
INVENTOR.
BY Herman F. Schneider
ATTORNEY.

Patented Sept. 22, 1942

2,296,311

UNITED STATES PATENT OFFICE 2,296,311

PARKING SIGNAL

Herman F. Schneider, Philadelphia, Pa.

Application August 14, 1939, Serial No. 290,133

5 Claims. (Cl. 116—28)

My invention is a parking signal designed to warn a driver of the movement of his vehicle toward or from a desired stopping place to enable him to avoid injurious impact with an obstruction, such as a garage wall, or the unnoted regression of the vehicle into the path of or too close proximity to a garage door or the like.

When an automobile is driven, either frontward or backward, into a usual private garage, considerable accuracy in stopping and positioning the car is required to avoid damage to the wall or to the bumper and at the same time avoid the projection of the bumper at the opposite end of the car into the path of, or into undesired proximity to, the garage door. My invention provides a series of sequential signals to a driver as the bumper of his vehicle approaches a garage wall, and a further series of signals should the car roll away from the desired stopping place after having been stopped.

My invention comprises, preferably, a portable base designed to be placed on a garage floor and having an alarm mechanism mounted on the weighted fore end thereof; the base being hindered from sliding along the floor, under the impact of a vehicle with the alarm mechanism, by anti-slipping devices such as rubber feet attached to the front and rear ends of the base.

The alarm mechanism preferably includes an operating arm consisting of a fulcrumed lever biased forwardly into the path of an on-coming vehicle by a spring having a tension permitting the rocking of the lever by a force applied to the free end thereof before such force tends to lift the weighted fore end of the base, thereby avoiding the tilting of the base on its anti-slipping devices as a fulcrum.

The operating arm is connected with a signal, such as a bell, indicator, electric light, or the like, through mechanism which effects the operation of the signal proportionately to the movement of the operating arm in either direction. The driver may thereby be warned, first, when he is approaching "stop" position, when he reaches "stop" position, and when he has passed "stop" position and is in dangerous proximity to the wall. Likewise signals will be given indicating the extent of his retrogression from the wall on rolling backward after stopping.

The characteristic features and advantages of my improvements will further appear from the following description and the accompanying drawing in illustration thereof.

In the drawing, Fig. 1 is a fragmentary diagrammatic view illustrating my improved parking device in position for sounding a warning on the approach of an automobile toward a garage wall; Fig. 2 is a broken top plan view of the device shown in Fig. 1 with most of the dome portion of the alarm gong broken away to show the interior construction; Fig. 3 is a broken fragmentary vertical longitudinal sectional view through the signal mechanism shown in Fig. 2 approximately on the line 3—3 thereof, and Fig. 4 is a transverse vertical sectional view taken on line 4—4 of Fig. 3.

In the embodiment of my invention illustrated in the drawings, a flanged sheet metal base 1 is provided with rubber feet 2 and has attached to the fore end thereof the weight 3.

A plate 4 and bracket 5 are fixed to the base 1. A gong 6 is fixed to the bracket 5 and contains a slot 7 for the passage of a lever 8 which is fulcrumed on a pintle 9 set in the bracket 5. A coiled spring 10 has one end anchored to a pin 11 of the plate 4 and its other end connected with a pin 12 in the lower part of the lever 8 so as to bias the upper end of the arm forwardly into the path of the bumper A of a vehicle.

The lower end of the lever 8 is engaged in the slot 13 of a slide 14 which is rectilineally movable by the lever 8 in the slideway 15 of the plate 4.

The slide 14 contains a bent groove, such as the zig-zag slot 16, for the engagement of a pin 17 depending from a slide 18 which is movable transversely to the slide 14 and holds the latter in the slideway 15.

The slide 18 is held in sliding engagement with the plate 4 by headed pins 19 fixed in the plate 4 and having their shanks engaged in the slots 20 of the slide 18. Apertured metallic disks 21 and 21' are loosely connected with the opposite ends of the slide 18 by headed pins 22 having shanks of less diameter than the apertures in the disk 21 and secured in the slide 18.

A bowed leaf spring 23 has its ends set in the bosses 24 of the plate 4 and the intermediate portion of the spring passes through a slotted pin 25 set in the slide 18.

In the intended utilization of my device the base is placed on the floor of a garage adjacent to the rear wall thereof and with the lever 8 projecting at an incline forwardly from the garage wall. The lever is of such length that its upper end lies in the path of the bumper A or other suitable part of the vehicle approaching the wall. When the bumper engages the upper part of the lever 8, the latter is turned on its pivot and thereby moves the slide 14 rectilineally in its slideway 15 toward the front end of the base. The forward movement of the slide 14 causes the cam edges formed by the slot 16 to shift the pin 17 and slide 18 transversely of the plate 14 until the center of the spring 23 has passed its dead center position between the posts 24. Thereupon the spring 23 expands in the opposite direction from that which it initially occupied and imparts a snap action to the slide 18 which moves the disk 21 into engagement with the gong 6 to sound a signal. These movements of the plates 14 and 18 result in the positioning of the pin 17 in the apex formed between the first zig and zag of the slot, so that further movement of the lever 6 and forward movement of the slide 14 causes the cam surfaces formed by the zag section of the slot to move the pin 17 and plate 18 toward their original position. When the spring 23 has been moved past its dead center position, it expands to its original position and imparts a snap action to the slide 18 causing the disk 21' to contact and ring the gong 6. Further movement of the lever 6 rearwardly and shifting of the plate 14 forwardly causes the third section of the slot 16 to again shift the pin and slide 18 so as to move the spring 23 past its dead center position, thereby imparting a snap action to the slide 18 and causing the disk 21 to contact and ring the bell a third time just before the vehicle strikes the wall.

If the vehicle should move away from the wall while the upper end of the lever 8 is turned toward its rearward position and the spring 10 is under tension, the release of the pressure on the upper end of the lever 8 permits the spring 10 to move the lever thereby moving the plate 14 toward the rear of the base. This rearward movement of the plate acts in the same manner as the forward movement thereof to move the pin 17 and slide 18 transversely of the plate 14, and each resulting movement of the spring 23 past its dead center position imparts a snap action to the slide 18 which causes the disks 21 and 21' respectively to impact and sound the signal.

Having described my invention, I claim:

1. In an apparatus of the character described, a pair of transversely disposed slides, one of said slides having a cam-groove containing a slot and the other of said slides having a member engaging in said cam-groove and bodily rectilineally movable thereby, means including a fulcrumed lever entering said slot for moving the slide having said cam-groove, and a signal operable by the other of said slides.

2. In a device of the character described, a slide containing a zig-zag groove, a slide having a member engaged in said groove, an arm for operating the slide containing the groove and a signal operable by a bodily rectilineal movement of the other of said slides on the approach of said member toward the end of a zig or of a zag of said groove upon the action thereon of each of consecutive angularly disposed walls of said zig-zag groove.

3. In a device of the character described, a slide, an arm for moving said slide in one direction, means for normally biasing said slide and arm in the opposite direction, a slide bodily movable transversely to said first named slide, said slides having co-acting members whereby the movement of the first slide actuates the second slide in each of a plurality of sequential positions of the first slide, toggle means including a spring in parting a snap action to said second slide in the direction in which it is moving when moved to each of a sequence of predetermined positions by said first slide, and a signal operable by said second slide.

4. In a device of the character described, a fulcrumed arm, a slide movable rectilineally by rocking said arm and containing a zig-zag groove, a coiled spring normally biasing said slide and arm toward one position, a slide movable transversely to said slide first named and having a member engaged in said groove, means comprising a bowed spring connected with and imparting a snap movement to said second named slide upon movement thereof in either direction by said first slide, and a gong operable by said second slide upon the movement thereof in either direction.

5. In a device of the character described, an operating arm, a signal, and means operable step by step to intermittently actuate said signal upon the movement of said operating arm in either direction, said means comprising a pair of slides bodily rectilineally movable transversely to one another and a toggle mechanism connected with one of said slides and augmenting movement imparted thereto from said arm through the other of said slides.

HERMAN F. SCHNEIDER.